April 2, 1963  J. MAUGHAN  3,083,777
HYDRAULIC LIFT CONTROL MECHANISM
Filed Aug. 11, 1960  6 Sheets-Sheet 1
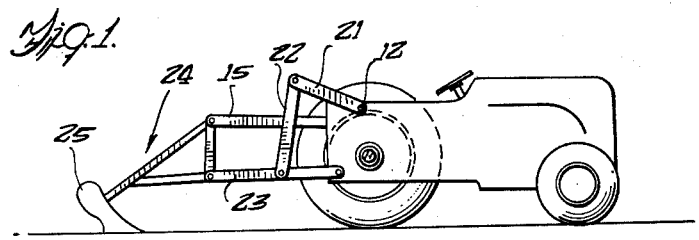
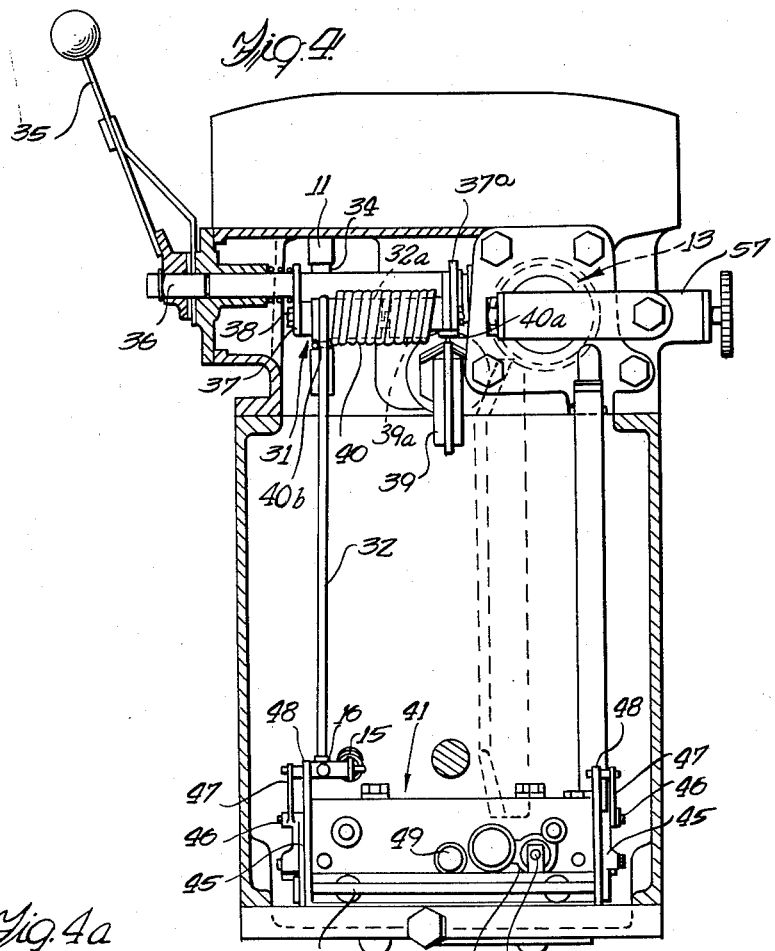
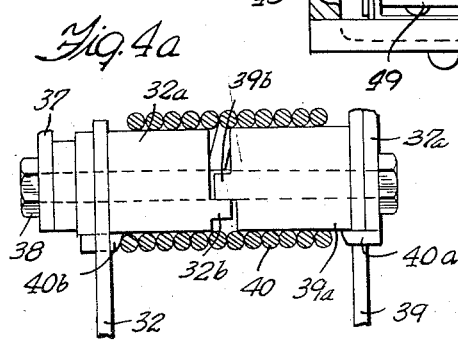
INVENTOR
JOHN MAUGHAN
Paul O. Rippel
ATTORNEY

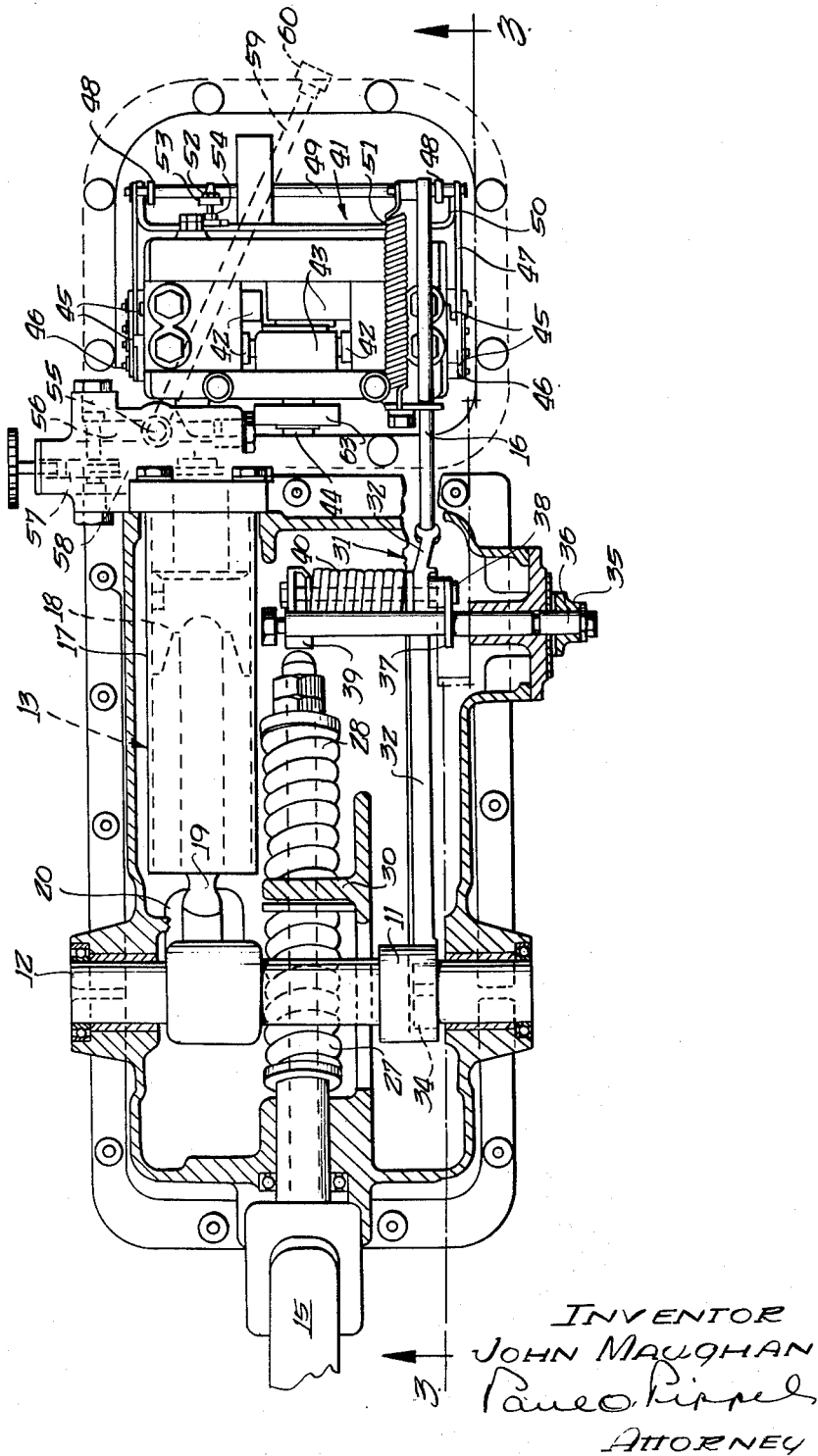

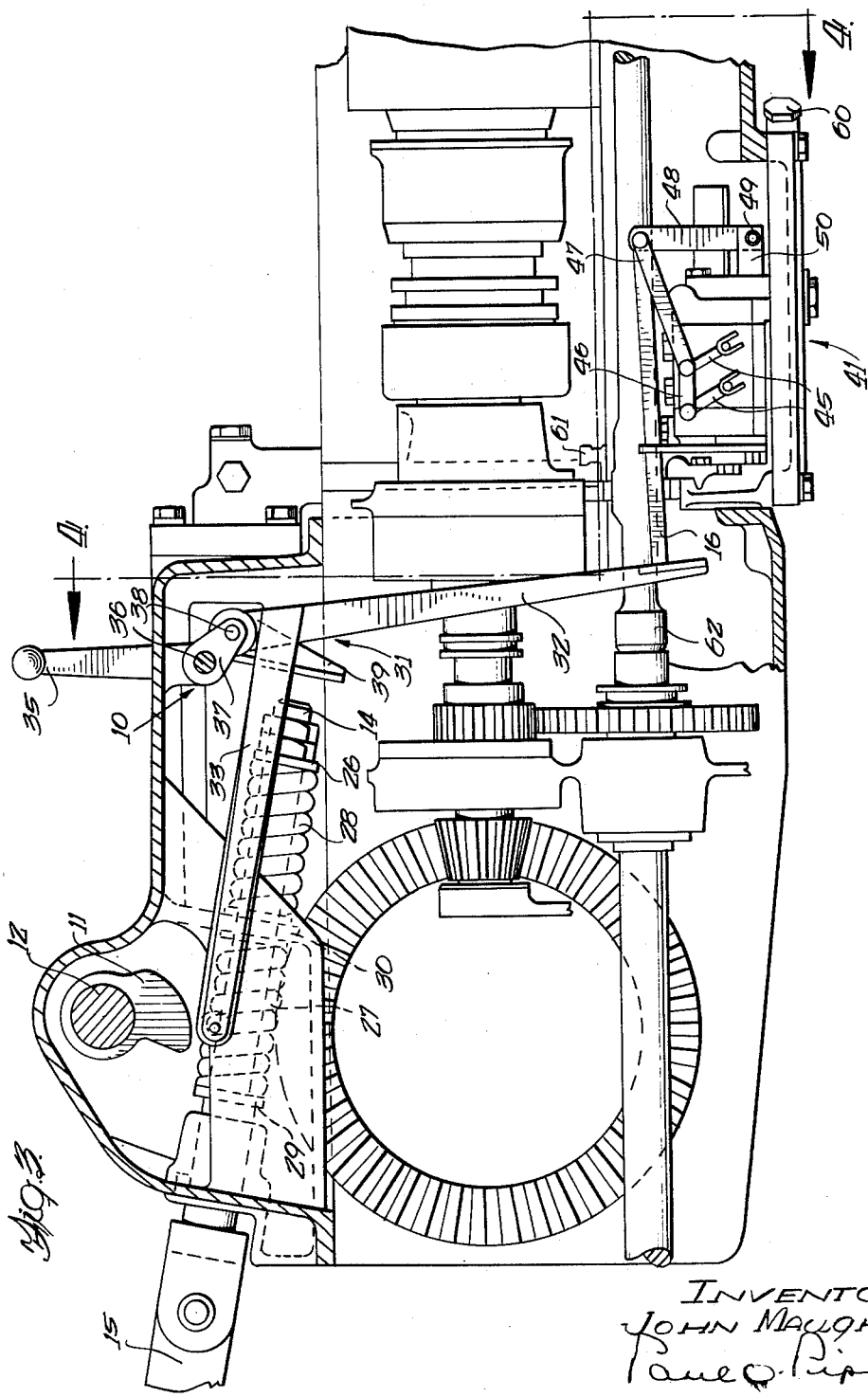

April 2, 1963  J. MAUGHAN  3,083,777
HYDRAULIC LIFT CONTROL MECHANISM
Filed Aug. 11, 1960  6 Sheets-Sheet 4

INVENTOR
JOHN MAUGHAN
Paul O. Pippel
ATTORNEY

April 2, 1963   J. MAUGHAN   3,083,777
HYDRAULIC LIFT CONTROL MECHANISM
Filed Aug. 11, 1960   6 Sheets-Sheet 5
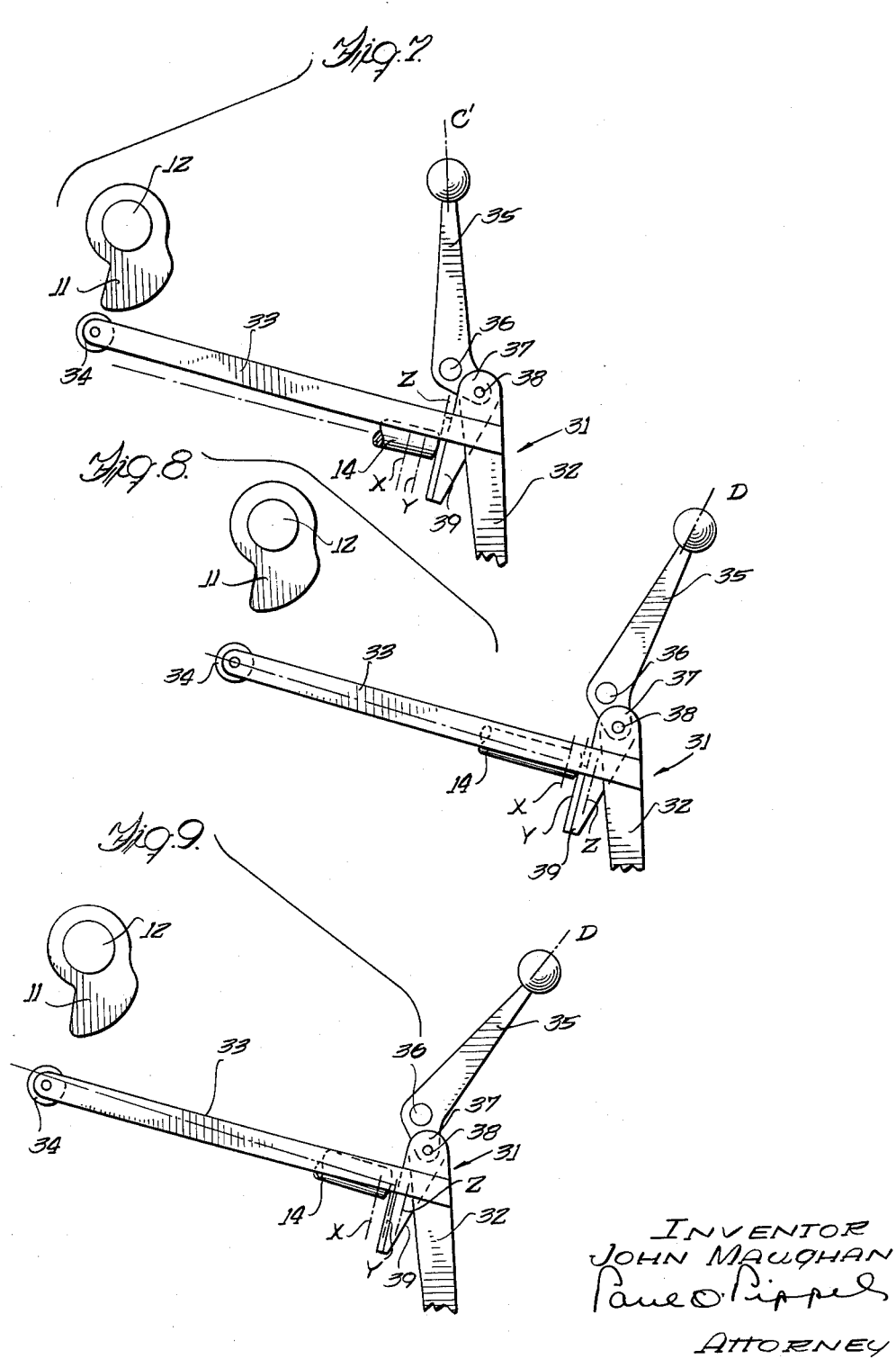
INVENTOR
JOHN MAUGHAN
Paul O. Pippel
ATTORNEY

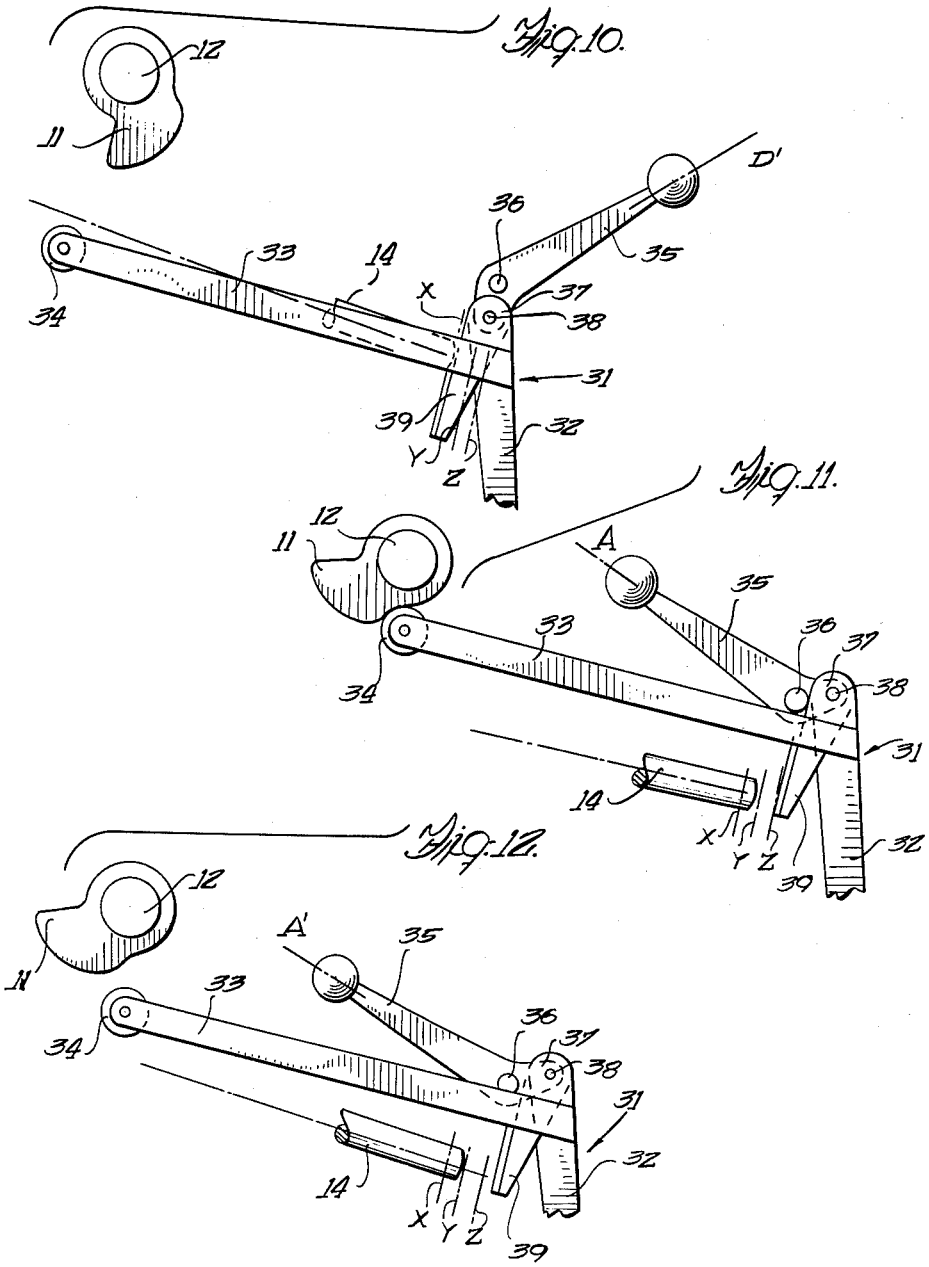

United States Patent Office 3,083,777
Patented Apr. 2, 1963

3,083,777
HYDRAULIC LIFT CONTROL MECHANISM
John Maughan, Hyde Park, Doncaster, England, assignor to International Harvester Company, Chicago, Ill., a corporation of New Jersey
Filed Aug. 11, 1960, Ser. No. 48,961
5 Claims. (Cl. 172—9)

This invention relates to control mechanism for hydraulic power lift system of the type used for operating a three-point type hitch or implement-attaching linkage associated with an agricultural tractor vehicle. More particularly however, it relates to a control mechanism of the type which is adjustable under manual control for raising and lowering said hitch linkage, and which is alternatively operable either by a movable member of the power lift device for achieving "position control" operation wherein the power lift is operated so that the attached implement is raised or lowered to follow movement of a manual control member and to assume a position determined by the setting of said manual control member, or by a draft-responsive member for achieving automatic "draft control" operation responsive to a predetermined draft load imposing a compression or tension loading in a top link of the implement-attaching linkage with the implement at a working depth determined by the setting of said mechanism under manual control. As is well understood, position control is used primarily with implements which are supported at or above ground level, such as mower attachments, seed drills, fertilizer distributors, swathe turners and the like, whereas automatic depth control is primarily applicable to implements, such as plows, that operate below ground level and impose a draft load, in the form of a compression or tension loading on the attaching linkage, dependent on working depth, soil density and type of implement used.

In control mechanisms previously provided for this purpose manual control thereof usually involved the use of at least two manually operable members, with one member functioning as a main control for operating the mechanism for raising or lowering the implement to a selected position under "position control," or for selecting a predetermined working depth of the implement with automatic "draft control," while the other member functioned as a selector to put the position control arrangement into or out of action as required. Since many such prior mechanisms were complicated and costly to install and frequently were confusing to operate they were not always satisfactory, hence it is a feature of the present device to provide a mechanism which overcomes these difficulties and objections.

It is a primary object of the present invention, therefore, to provide improved control mechanism of the character heretofore mentioned wherein change-over from position control, or operations at or above ground level, to automatic draft control, or operations at below ground level, and vice versa, may be easily effected automatically without the use of a selector member by a single operating lever.

Another object is to provide an improved control mechanism of the character described that includes a compound lever mechanism so arranged as to be operable by a manual control member for providing a slow lift or fast lift of the implement to a transport position.

A further object is to provide an improved control mechanism, applicable for use with a hydraulic lift control means operable by a draft-responsive member, for providing automatic draft control.

A still further object is to provide a control mechanism, applicable for use with hydraulic lift control means embodying a variable delivery rate pump, that is operable for acting on a member cooperative therewith for controlling the delivery rate of said pump.

A general object of the invention is to provide a control mechanism for the purpose outlined which comprises a compound lever system arranged and adapted to be operated by a single manual control member so that in one portion of the range of travel of said member the control mechanism is conditioned for position control operation, while in another portion of the travel range thereof said mechanism is conditioned for automatic draft control operation.

A more specific object of the invention is to provide a control mechanism of the character described that includes a compound lever system having elements therein operable, respectively, by a draft-responsive member, a movable member of a hydraulic lift system and a single manually operable control member, whereby in the portion of the range of travel of said control member which corresponds with the maximum lift and intermediate position of an attached implement, said control member and said movable member act in concert with one another on the control mechanism for providing position control, while in another portion of said travel range said manual control member and said draft-responsive member act in concert on the control mechanism for providing automatic draft control at a working depth selectable by the setting of said manual control member in the second portion of its travel range.

A further detailed object of the invention is to provide, in a draft control arrangement wherein the draft-responsive member reacts against means operating to balance compressive or tensile stresses in the top link of an implement-attaching linkage, a compound lever system control mechanism so arranged that when a manually operable control member thereof is moved from the portion of its range of travel that establishes position control operation for the linkage to the portion of its travel range that establishes automatic draft control operation, said control mechanism operates with automatic draft control with maximum compression load in the top link of said implement-attaching linkage, while on further movement of said control member away from said position control range the control mechanism is set for progressively reduced compression loading on the top link and thereafter progressively increasing tension loading on the top link.

The foregoing and other objects and features of the invention will become apparent as the disclosure is more fully made in the following detailed description of a preferred embodiment of the invention as illustrated in the accompanying sheets of drawings in which:

FIG. 1 is a generally schematic side elevational view of a conventional agricultural tractor equipped with a three-point type of implement-attaching linkage including hydraulic power lift and control means therefor;

FIG. 2 is a plan view, having a portion thereof shown in section, of a power lift and control means therefor that incorporates the improved control mechanism of the present invention;

FIG. 3 is a longitudinal and vertical sectional view taken on the line 3—3 of FIG. 2;

FIG. 4 is a vertical sectional view taken on the line 4—4 of FIG. 3;

FIG. 4a is a fragmentary sectional view, in enlarged dimensions, of the clutching means employed for yieldably interconnecting certain levers of the control mechanism shown in the preceding view;

FIG. 7 shows the relative positions of the components when the control lever is at position C', wherein position control operation becomes ineffective and draft control operation with maximum compression load on the top link member of the hitch linkage comes into operation;

FIG. 8 shows the relative positions of the components when the control lever is at position D for operating with automatic draft control with low compression loading in the top link member;

FIG. 9 shows the relative positions of the components when the control lever is positioned somewhat beyond the position D for automatic draft control operation with a light tension load in the top link member of the hitch linkage;

FIG. 10 shows the relative positions of the components when the control lever is positioned at D' for operating with automatic draft control with maximum tension load in the top link member of the hitch linkage;

FIG. 11 shows the relative positions of the components when the control lever is positioned at A for normal or slow lift of the implement to a transport position; and FIG. 12 shows the relative positions of the components when the control lever is positioned further to the left at A' to operate the lever mechanism for achieving a fast lift to transport position.

Figure 5:
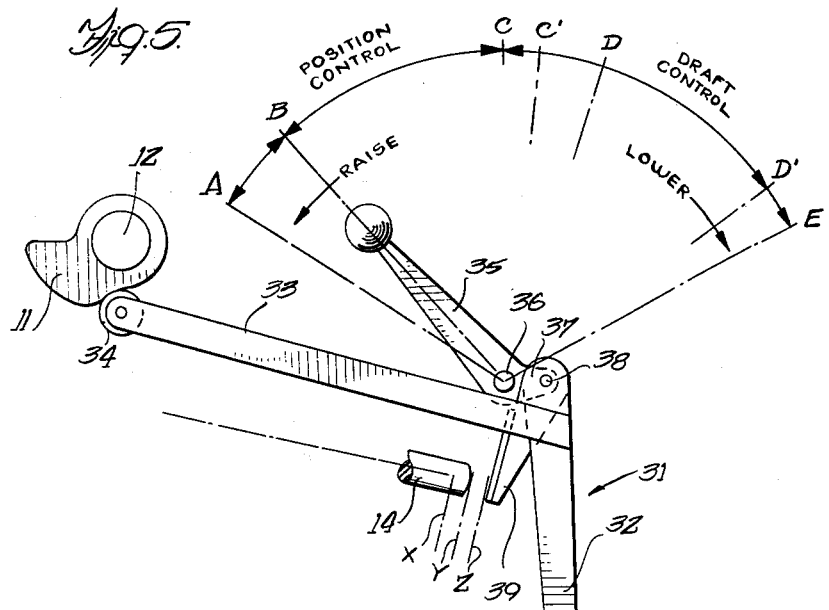
FIG. 5 is a generally schematic representation of the control mechanism and shows the relative positions occupied by the various components thereof when the manual control member is at position B for position control operation at maximum height above ground level.

Referring now to the drawings, where there is illustrated one preferred embodiment of an application of the present invention, it will be seen that the control mechanism proposed comprises a compound lever system, indicated generally at 10, that is arranged to cooperate with a cam 11 constrained for rotation with a lift arm rock shaft 12, in turn, operable by a hydraulic ram unit shown generally at 13, a rod element such as 14 pivotally connected to and for operation by a draft-responsive link member 15, and an actuable push rod member 16 operatively associated with suitable hydraulic lift control means. The hydraulic ram unit 13 may include a cylinder 17 having a piston 18 therein for operating a push-rod 19 that engages a crank-arm 20 affixed to the rock shaft 12 for rotative movement thereof. It will be understood, of course, that suitable hydraulic circuits connecting the hydraulic lift cylinder to a source of fluid pressure and to a control valve therefor will be provided as is customary and well understood.

The rock shaft 12 also carries lift arms, such as shown at 21 (FIG. 1), that are connected by lift links 22 to the lower links 23 of a conventional three-point implement-attaching or hitch linkage, indicated generally at 24, for raising and lowering an implement, such as the plow indicated at 25, carried by said linkage. The draft-responsive mechanism may be fashioned with a member 15 as a part of the top link of said three-point linkage and may be pivotally connected to the push-rod element 14, which, in turn, is provided with an abutment collar 26 threaded on the free end thereof adapted to coact with axially aligned springs 27 and 28 disposed between said collar and shoulder or abutment 29 on said rod with an intermediate fixed abutment 30 therebetween. Since these springs have no pre-load they can operate independently with the spring 27 being disposed to react against compressive loading in the draft responsive member 15 while the spring 28 reacts against tension loading in said member.

The operating lever or control mechanism according to the present invention may comprise a double-armed lever, such as the bell-crank member indicated at 31, which has the free end of one arm 32 thereof coacting and engageable wtih the actuable rod member 16, while the free end of the other arm 33 thereof is provided with a roller 34 adapted to engage and coact with the cam 11 on rock shaft 12. A manually operable operator's control lever 35 is mounted on a shaft 36 that has axially spaced-apart crank arms 37 and 37a thereon for carrying between them a rod or shaft 38 that functions as a fulcruming support for pivotally and rotatably carrying the bell-crank member 31. The free end of push-rod element 14 is positioned to abuttingly engage and coact with a lever arm 39 also pivotally and rotatably mounted on the fulcrum shaft 38, while a coil spring 40, circumscribing said fulcrum shaft has one tail end 40a bent over and abutting a forwardly facing end edge of lever arm 39 while the opposite tail end 40b is bent over and abuts a rearwardly facing end edge of arm 32 of bellcrank 31 so that the said lever arm (as viewed in FIG. 3) is urged resiliently in a direction opposite to that of the bell-crank, whereby dogs 32b and 39b, fashioned on the respective bosses 32a and 39a affixed to and projecting from the respective bell-crank arm 32 and lever arm 39 and rotatably mounted on fulcrum shaft 38, are maintained normally in engagement with one another. This arrangement of the engageable dogs, bosses and spring may thus be said to constitute a form of clutch means for operatively interconnecting the lever arm 39 and bell-crank 31 in a motion-transmitting relationship that is interruptable or yieldable to permit relative rotative movement therebetween. The spring 40 is positioned with tension to prevent relative movement between the lever arm 39 and the bell-crank 31 when working normally, but should a draft overload occur which tends to move the pump control mechanism beyond its range of movement, excess movement of said lever arm when further movement of said bell-crank member is obstructed, will merely add more tension to said spring as a result of relative movement between the said lever arm and the bell-crank members. The spring 40 thus functions as an overload release to aid in preventing an overload of the pump control linkage.

The hydraulic lift control means, preferably, includes a variable delivery rate pump of the type generally similar to the unit shown and described in copending U.S. patent application, Serial 18,689, now abandoned, assigned to the same assignee, and indicated generally at 41. Suffice it to say here that said pump comprises pairs of opposed pistons, such as shown at 42 (FIG. 2), operable against the action of springs (not shown herein) by means of eccentrics 43 mounted on a common shaft 44. The delivery rate of the pump is variable from a normal zero up to a predetermined maximum by the operation of levers such as 45 connected by links 46, 47 to levers 48 mounted on a shaft 49 rotatably mounted in a bracket 50 carried by said pump. One of said levers 45 is pivotally interconnected with the actuable member 16 that is cooperative with arm 32 of bell-crank 31, and said actuable member is normally urged to a zero position of the pump 41 by means of a spring such as 51 (FIG. 2). An adjustable stop member 52 carried by an arm 53 suitably affixed to the shaft 49 coacts with a fluid release valve member 54 for releasing or venting fluid from the hydraulic lift system for lowering the implement as is more particularly explained in said copending application. The pump 41 is communicatively connected to the cylinder 17, of ram unit 13, by way of a vertical passage 55 (FIG. 2), horizontal passage 56, isolator or shut-off valve 57 and passage 58. A branch passage 59 extending from the vertical passage 55 is provided with an outlet connection 60 for the operation of auxiliary hydraulic motor devices that may be associated therewith. The pump shaft 44 of said pump may be driven in any suitable or well-known manner, such as by a gear 61 on the power take-off shaft 62 (FIG. 3) that is in meshing engagement with a gear 63 (FIG. 2) constrained for rotation with said pump shaft.

By virtue of the draft load reaction on the top link draft-responsive member 15 of the implement-attaching linkage, the pivotally connected rod element 14, which is displaceable as a result of movement by said draft-responsive member, is movable between the extreme positions indicated by the lines X and Z (FIG. 5), while the neutral position of this element, corresponding to "no load" on the hitch linkage, is indicated by the line Y. When an attached implement is in an elevated or transport position above ground level, there will be a tension load on the draft-responsive member 15 proportional to the dead weight of said implement, and the engageable rod element 14 will assume a position slightly to the left of line Y, while movements of said element 14 from said line Y to the left will correspond with increasing amounts of tension loading on the top link draft-responsive member up to a maximum at the line X, which in the present instance may approximate 3,000 pounds. Similarly, movement of the element 14 from the line Y towards the line Z corresponds to an increase in compression load on said top link up to a maximum at the line Z, which in the present instance may approximate 3,000 pounds.

Operation

In FIGS. 5 and 11 it will be noted that when the operator's manual control lever 35 is at the position indicated as A the hydraulic lift system will have been operated to rotate the rock-shaft 12 in a clockwise direction thereby raising the lift arms 21 and the implement-attaching linkage 24 to a transport or maximum lift position. Since there is no draft load on the top link or draft-responsive member 15 when the implement 25 is carried above ground level the rod element 14 attached to said member is in a static position and the free end thereof will be disposed generally to the left of the position indicated by line Y an amount proportional to the tension loading created by the dead weight of the implement and hence said element will be out of contact with the lever arm 39. Now when the arm 32, of bell-crank 31, moves to the right from a neutral position the actuable rod 16 is engaged and this, in turn, operates to put the control means of the hydraulic system to "lift," and when said arm 32 moves to the left the member 16 then effects operation of the release valve 54 to release fluid from the hydraulic system at a regulated rate to permit lowering of the hitch linkage. It will be seen, therefore, that in event of a leakage in the hydraulic system the ram unit 13 will allow the rock-shaft 12 to rotate counter-clockwise, whereupon the cam 11 acting on roller 34 causes the bell-crank 31 to swing about its fulcrum support 38 thereby motivating the control means, through the actuable member 16, and putting it to "lift" to compensate for such leakage following which the rock-shaft 12 and its attached cam 11 are restored to a position corresponding to the pre-selected setting of the manual control lever 35.

If the manual control lever 35 is moved clockwise to or beyond the position B the fulcruming support 38 will be rotated about the shaft 36 thus causing said support to be lowered whereupon the bell-crank 31 will swing about the point of contact of the roller 34 with cam 12 and thus cause the arm 32 of said bell-crank to move to the left away from the member 16 thereby permitting the hydraulic control means to release fluid from the lift system and attendant thereto effect a lowering of the implement-attaching linkage. As the hitch linkage is lowered the cam 11 rotates counter-clockwise and when so doing, by way of the engaging follower roller 34, moves the arm 32, of bell-crank 31, to the right to restore it to a neutral position when the amount of lowering movement corresponds to the pre-selected position at which the manual control lever 35 has been set in the range B—C. Similarly, if the control lever 35 is moved counter-clockwise in the range B—C, the fulcruming support 38 is lifted thereby causing the bell-crank 31 to swing about the point of contact between cam 11 and roller 34, with the result arm 32 is moved to the right to engage and actuate the member 16 and thus put the hydraulic control means to "lift," whereupon the ram unit 13 rotates the rock-shaft 12 to raise the implement-attaching linkage until the arm 32 again returns to its neutral position.

When the manual control lever 35 is at position B, the elements of the control mechanism will be disposed substantially as shown in FIG. 5. This position corresponds approximately to the highest position of the implement for operation above ground level under position control operation and is the normal neutral position thereof. If it is desired to use an auxiliary hydraulic motor connected to the outlet at 60 the isolator or shut-off valve 57 is closed to prevent operation of the ram unit 13 and then any movement of the control lever 35 from the position B towards position A (FIG. 5) will operate to put the pump 41 to delivery in proportion to the amount of movement of said control lever.

Figure 6:
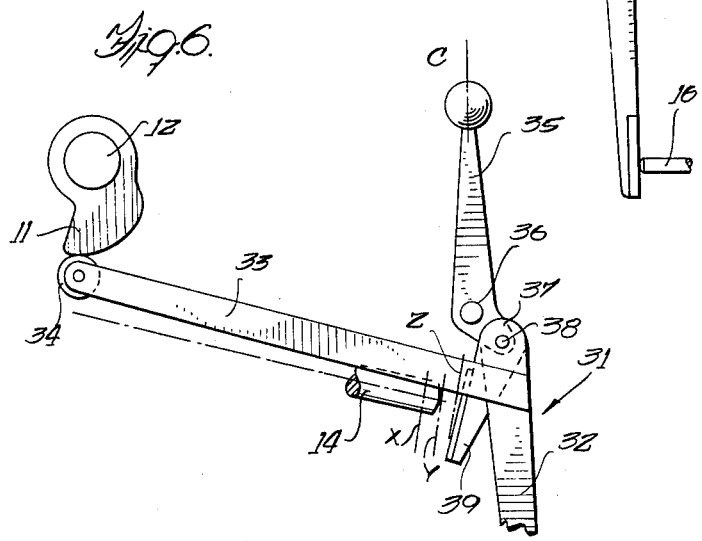
FIG. 6 shows the relative positions of the components when the control lever is at position C for position control operation at minimum height above ground level.

In FIG. 6 the control lever 35 is shown positioned at position C which corresponds approximately to the lowest position of the implement for position control operation, without draft control over-riding, and it will be seen that in such position the gap clearance between the rod element 14 and the arm 39 is still relatively large.

When the control lever 35 is moved from the position C to the position C', as shown in FIG. 7, an associated implement, such as a plow, will operate with automatic draft control at maximum depth and with maximum compression load on the top link member 15, while the rod element 14 moved to the line Z will be in position to cooperate with the arm 39 of the control mechanism. It is customary in practice for many position control implements to operate at ten inches or more above ground level, while many implements concerned with draft control operate with a load of less than 2000 pounds in the top link member 15 and these factors usually bring about an overlap in the change-over range from position control to draft control, and vice versa. Such change-over takes place when the control lever 35 is in such a position that any further counter-clockwise rotation of the cam 11 will not restore the control means to neutral, and such condition arises when said control lever is at the position C' as seen in FIG. 7. When the rod element 14 is positioned to cooperatively engage the arm 39 draft control is operative, in fact the rod element 14 is always in contact with the arm 39 when operating with draft control, and the exact point of change-over depends on the amount of load on the top link member 15 and whether such is in compression or tension, and the control lever 35 is located somewhere between the C and D' positions. Thus, it will be seen, the actual change-over may take place at different positions of the control lever 35.

When the control lever 35 is moved from C' toward the position E the bell-crank 31 is pivoted about the point of contact between rod element 14 and the arm 39 which then moves said arm to the right and puts the hydraulic system to "lift," and following this the arm 32 will be restored to its neutral position by the spring 51 when the compression load on top link member 15 is reduced sufficiently to permit the element 14 to be retracted towards the line Y. Now with any particular implement depth setting of the control lever 35 between the approximate positions C' and D, the element 14 being in contact with arm 39 will move the bell-crank 31 counter-clockwise about fulcrum 38 for lifting the implement if draft load in compression increases, and clockwise to effect a lowering if the draft load decreases. When operating in the draft control range the follower roller 34 is out of contact with the cam 11 and hence position control is not in operation.

When the draft implement is operated with the top link member in tension, as is the case in some hitch linkage arrangements, the free end of the rod element 14 will be located between the lines X and Y, or even further to the left, depending on the amount of tension loading. Under this condition movement of the control lever 35 between the positions D and D' determines the depth at which automatic draft control is established, and movement of lever 35 from D towards D' will cause the bell-crank 31 to pivot about the point of contact between element 14 and the arm 39 thus moving said arm to the right and putting the hydraulic control means to "lift." Hence, when the implement, operating under such conditions, is raised, tension will increase due to the increased effect of the dead weight of the implement, and consequently the element 14 will be retracted sufficiently to enable the arm 32 to be restored to its neutral position when the tension load on top link member 15 corresponds to the depth setting of the control lever 35 between D and D'. Once the desired working depth is set any variation in tension in the member 15 will shift the element 14 so that the arm 32 is caused to move in one direction or the other to lift or lower the implement as required to maintain a substantially uniform draft load or working depth.

If, due to undulations in terrain and consequent fore and aft pitching movements of the tractor or to variations in soil density, the implement tends to sink below the predetermined level, increased draft load in compression, or reduced load in tension, on the top link member 15, will shift the element 14 so that it engages and moves the arm 39 and causes the hydraulic lift system to raise the implement until the predetermined draft load is restored. Similarly, if the working depth should be reduced, reduction in draft load in compression, or increase in draft load in tension, will act to shift the element 14 so that the mechanism operates to lower the implement until the draft load is again restored to the predetermined amount corresponding to the setting of lever 35 between the C and E positions.

When it is desired to operate with automatic draft control, the control lever 35 is moved to a selected depth setting between the positions C' and D as soon as the implement is lowered. Since a certain time lag occurs before the implement reaches its working depth, it will be understood that, if the depth is shallower than that required, the hydraulic system will be returned to neutral when the implement reaches the selected depth. In similar manner, if the implement is at a shallow depth setting, and the control lever 35 is moved out of the draft control range into the position control range, or further towards the position A, to put the implement to "lift," there will not be time for the implement to go deeper before it is elevated.

If draft control is in operation and the control lever 35 is moved to the C position, the mechanism is actuated so that the implement is raised and the draft is reduced. If the draft is reduced sufficiently, the implement will be held in position control and this can occur when the machine is in contact with the ground or above ground. As before mentioned, position C corresponds to the lowest approximate position for operation with position control. If a ground-engaging implement is being used with position control, it is possible that sufficient draft load can occur to put the control mechanism to "lift." Once the draft load is again reduced, the implement would again fall to the position corresponding to the setting of the lever 35. It will not be working with draft control, because even if the draft load falls to zero, the implement cannot fall lower than the setting corresponding to the lever 35. The implement may be positioned at any desired height above ground level by movement of the control lever 35 between positions B and C.

When the control lever 35 is moved to the position A, as shown in FIG. 11, the bell-crank 31 pivots about the point of contact between the roller 34 and the cam 11 so that the arm 32 is displaced to the right to actuate the member 16 of the control valve means to put the hydraulic system to "lift" at normal or slow rate. However, the lever mechanism is so arranged that if the control lever 35 is moved further to the left to position A', as seen in FIG. 12, the pump 41 is put to full delivery and any position between A and A' will give proportionate delivery. The position A' is generally used only with auxiliary devices.

From the above it will be appreciated that the proposed device facilitates the use of a tractor with either above-ground or below-ground implements, since change-over from position control operation to automatic draft control operation, and vice versa, may be accomplished automatically under control of a single manually operable lever and does not require the provision of auxiliary attachments or any form of selector mechanism involving a separate manual control. Furthermore, it will be seen that movement of the single manual control member between extreme limits of its travel provides position control for above-ground implements, and automatic draft control operating with the top link of the hitch linkage either in compression or in tension for below-ground implements. Hence, by operation of the single manual control lever, an implement may be set with position control at any desired height above ground level or, with automatic draft control, at any desired depth below ground level. It will also be seen that when an implement is raised to an elevated transport position, the position control arrangement functions in well-known manner to compensate for any leakage in the hydraulic system and thereby prevents or limits downward movement of the attached implement due to such leakage.

While only one form of the invention has been shown, it will be obvious to those skilled in the art that it is not so limited, and that a compound lever mechanism adapted to operate in the manner described for giving position control operation above ground and automatic draft control operation below ground by the use of a single manual control member may be otherwise constructed and arranged, and since it is susceptible of various changes and modifications without departing from the spirit thereof, it is desired, therefore, that only such limitations shall be placed thereon as are specifically set forth in the appended claims.

What is claimed is:

1. In a tractor having implement-attaching mechanism for supportably attaching an implement thereto, a power lift means operable for raising and lowering said implement, an actuator element for controlling the power lift means, a position-responsive member operable by said lift means attendant the raising and lowering movements of the implement, and draft-responsive mechanism which is susceptible to movement upon being subjected to variations in draft loads on the implement, the improvement comprising: a rotatably disposed control lever; a tractor mounted support for said control lever; a double-armed lever having one arm engageable with said position-responsive member and the other arm thereof being engageable with said actuator element; a lever arm engageable with said draft-responsive mechanism; said control lever having a portion thereon affording a fulcrum for pivotally supporting said double-armed lever and said lever arm, and which fulcrum is shiftable about the axis of rotation of said control lever; resilient clutch means disposed between said double-armed lever and said lever arm and arranged for normally constraining said double-armed lever for movement with said lever but being yieldable to permit relative rotative movement therebetween; said control lever being operably disposed so that in one portion of the rotative range of travel thereof said one arm of said double-armed lever is engageable with and operably responsive to movements of said position-responsive member while said other arm is operably engageable with said actuator element for controlling the power lift means according to movements of said position-responsive member, and in another portion of the rotative range of travel of said control lever said lever arm is engageable with and operably responsive to movements of said draft-responsive member while concurrent therewith said other arm of said double-armed lever is operably engageable with said actuator element for controlling the power lift means according to movements of said draft-responsive member; said resilient clutch means being proportioned to accommodate a predetermined movement of said draft-responsive mechansim before yielding and interrupting the transmission of motion therethrough to provide overload release therefor.

2. In a tractor having implement-attaching mechanism for supportably attaching an implement thereto, a power lift means operable for raising and lowering said implement, an actuator element for controlling the power lift means, a position-responsive member operable by said lift means attendant the raising and lowering movements of the implement, and draft-responsive mechanism which is susceptible to movement upon being subjected to variations in draft loads on the implement, the improvement comprising: a rotatably disposed control lever; a tractor mounted support for said control lever; a bell-crank having one arm thereof positionable for engagement with said position-responsive member and the other arm thereof being positionable for engagement with said actuator element; a lever arm positionable for engagement with said draft-responsive mechanism; said control lever having an arm extending therefrom that provides a fulcrum support for pivotally supporting said bell-crank and said lever arm and which support is rockable about the axis of rotation of said control lever; resilient clutch means carried by said fulcrum support and operatively interconnecting said bell-crank with said lever arm and being disposed for normally constraining said bell-crank for movement with said lever arm but being yieldable to permit relative rotative movement therebetween; said control lever being operably disposed so that in the first part of the rotative range of travel thereof the fulcrum of the bell-crank is shifted in such manner that said bell-crank swings about the point of engagement of said bell-crank with said position-responsive member to effect operation of said power lift means, and in the second part of the range of rotative travel of said control lever said fulcrum is further shifted so as to bring said lever arm in close proximity to said draft-responsive mechanism while concurrent therewith said other arm of said bell-crank is brought into close proximity with said actuator element so as to effect operation of said power lift means and thereby maintain a predetermined working depth for the implement in response to movements of said draft-responsive member and in dependence on the setting of said control lever in the second part of its range of travel; said resilient clutch means being proportioned to accommodate a predetermined movement of said draft-responsive mechanism before yielding and interrupting the transmission of motion therethrough to provide overload release therefor.

3. In a tractor having implement-attaching mechanism for supportably attaching an implement thereto, a power lift means operable for raising and lowering said implement, an actuator element for controlling the power lift means, a position-responsive member operable by said lift means attendant the raising and lowering movements of the implement, and draft-responsive mechanism which is susceptible to movement upon being subjected to variations in draft loads on the implement, a control mechanism, comprising: a manually operable and rotatably disposed control lever; a tractor mounted support for said control lever; a bell-crank having a free end of one arm thereof positionable for engagement with and movement by said position-responsive member, and a free end of the other arm thereof being positionable for operatively engaging the actuator element for controlling said power lift means; an additional lever arm having the free end thereof positionable for engagement with and movement by said draft-responsive mechanism; said manually operable control lever having an arm extending angularly outwardly from its axis of rotation thereof providing a fulcrum for supportably carrying said bell-crank and said additional lever arm and having said fulcrum swingable about the axis of rotation of said control lever; resilient clutch means supportably carried by said fulcrum and operatively interconnecting said bell-crank and said additional lever arm and being disposed for normally constraining said bell-crank for movement with said additional lever arm but being yieldable to permit relative rotative movement therebetween; said control lever being operably disposed so that in one portion of the rotative range of travel thereof the free end of said one arm of said bell-crank is in engagement with and is responsive to movements of said position-responsive member while the free end of said other arm of said bell-crank is in operative engagement with the actuator element of said power lift means and said power lift means is operative responsive to movements of said position-responsive member while simultaneously the draft-responsive mechanism is maintained out of engaging contact with the free end of said additional lever arm, and in another portion of the range of rotative travel of said control lever the free end of said additional lever is disposed in operative engagement with said draft-responsive mechanism while the free end of said other arm of said bell-crank is in operative engagement with the actuator element of said power lift means and said power lift means is operative responsive to variations in draft loads on the implement while simultaneously therewith the free end of said one arm of said bell-crank is maintained out of operative engagement with said position-responsive member; said resilient clutch means being proportioned to accommodate a predetermined movement of said draft-responsive mechanism before yielding and interrupting the transmission of motion therethrough to provide overload release therefor.

4. In a tractor having implement-attaching mechanism for supportably attaching an implement thereto, a power lift means operable for raising and lowering said implement, an actuator element for controlling the power lift means, a position-responsive member operable by said lift means attendant the raising and lowering movements of the implement, and draft-responsive mechanism which is susceptible to movement upon being subjected to variations in draft loads on the implement, a control mechanism, comprising: a manually operable and rotatably disposed control lever; a tractor mounted support for said control lever; a bell-crank having a free end of one arm thereof positionable for engagement with and movement by said position-responsive member, and a free end of the other arm thereof being positionable for operatively engaging the actuator element for controlling said power lift means; an additional lever arm having the free end thereof positionable for engagement with and movement by said draft-responsive mechanism; said manually operable control lever having an arm extending angularly outwardly from its axis of rotation thereof providing a fulcrum for supportably carrying said bell-crank and said additional lever arm and having said fulcrum swingable about the axis of rotation of said control lever; resilient clutch means supportably carried by said fulcrum and operatively interconnecting said bell-crank and said additional lever arm and being disposed for normally constraining said bell-crank for movement with said additional lever arm but being yieldable to permit relative rotative movement therebetween; said control lever being operatively disposed so that in a first portion of the range of rotative travel thereof the fulcrum swings generally vertically about the axis of rotation of the control lever so that the free end of said one arm of said bell-crank is maintained in operative engagement with said position-responsive member and the free end of said other arm of said bell-crank is maintained in engaging contact with said actuator for controlling the operation of said power lift means responsive to the movements of said position-responsive member, and in a second portion of the rotative range of travel of said control lever the fulcrum swings generally horizontally about the axis of rotation of the control lever so that the free end of said additional lever arm is brought into engaging contact with said draft-responsive mechanism while concurrent therewith the free end of said other arm of said bell-crank is disposed in engaging contact with said actuator for controlling the operation of said power lift means responsive to the movements of said draft-responsive mechanism without interference from said position-responsive member; said resilient clutch means being proportioned to accommodate a predetermined movement of said draft-responsive mechanism before yielding and interrupting the transmission of motion between said additional lever arm and said bell-crank to provide overload release therefor.

5. In a tractor having implement-attaching mechanism for supportably attaching an implement thereto, a power lift means operable for raising and lowering said implement, an actuator element for controlling the power lift means, a position-responsive member operable by said lift means attendant the raising and lowering movements of the implement, and draft-responsive mechanism which is susceptible to movement upon being subjected to variations in draft loads on the implement, a control mechanism comprising: a manually operable and rotatably disposed control lever; a tractor mounted support for said control lever; a bell-crank having a free end of one arm thereof positionable for engagement with and movement by said position-responsive member, and a free end of the other arm thereof being positionable for operatively engaging the actuator element for controlling said power lift means; said movably operable control lever having an arm extending angularly outwardly from the axis of rotation thereof and providing a fulcrum member for supportably carrying said bell-crank and having said fulcrum swingable about the axis of rotation of said control lever; an additional lever arm mounted on said fulcrum and having the free end thereof positionable for engagement with and movement by said draft-responsive mechanism; resilient clutch means disposed between said bell-crank and said additional lever arm arranged for normally constraining said latter lever for movement with said bell-crank but being yieldable to permit relative rotative movement therebetween; said control lever being arranged so that in one portion of the range of travel thereof the free end of said one arm of said bell-crank is in engagement with and is responsive to movements of said position-responsive member while the free end of said other arm of said bell-crank is in operative engagement with the actuator element of said power lift means and said power lift means is operative responsive to movements of said position-responsive member while simultaneously therewith the draft-responsive mechanism is maintained out of engaging contact with the free end of said additional lever arm; said control lever being further arranged so that in another portion of the range of travel thereof the free end of said additional lever is disposed in operative engagement with said draft-responsive mechanism while the free end of said other arm of said bell-crank is in operative engagement with the actuator element of said power lift means and said power lift means is operative responsive to variations in draft-loads on the implement while simultaneously therewith the free end of said one arm of said bell-crank is maintained out of operative engagement with said position-responsive member; said resilient clutch means being proportioned to accommodate a pre-determined movement of said draft-responsive mechanism before yielding and interrupting the transmission of motion from said additional lever to said bell-crank to provide overload release therefor.

References Cited in the file of this patent
UNITED STATES PATENTS

| | | |
|---|---|---|
| 2,722,874 | Bopf | Nov. 8, 1955 |
| 3,003,568 | Merritt et al. | Oct. 10, 1961 |

FOREIGN PATENTS

| | | |
|---|---|---|
| 805,061 | Great Britain | Nov. 26, 1958 |